United States Patent
Luo et al.

(10) Patent No.: US 7,294,805 B2
(45) Date of Patent: Nov. 13, 2007

(54) KEY STRUCTURE APPLICABLE IN AN ELECTRONIC DEVICE

(75) Inventors: You-Fa Luo, Taipei (TW); Yung-Chi Yang, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/395,753

(22) Filed: Mar. 31, 2006

(65) Prior Publication Data
US 2007/0056836 A1    Mar. 15, 2007

(30) Foreign Application Priority Data
Sep. 15, 2005    (TW) ............... 94215881 U

(51) Int. Cl.
*H01H 3/40* (2006.01)

(52) U.S. Cl. ...................... 200/500; 200/5 A

(58) Field of Classification Search ............... 200/5 A, 200/313, 341–345, 314
See application file for complete search history.

(56) References Cited

U.S. PATENT DOCUMENTS 5,569,889 A * 10/1996 Bruner ................. 200/5 A
6,219,038 B1 * 4/2001 Cho ..................... 345/173
6,812,862 B1 * 11/2004 Dempsey ................. 341/22
7,172,303 B2 * 2/2007 Shipman et al. ............ 362/29

* cited by examiner

*Primary Examiner*—Michael A Friedhofer
*Assistant Examiner*—Lisa Klaus
(74) *Attorney, Agent, or Firm*—Peter F. Corless; Steven M. Jensen; Edwards Angell Palmer & Dodge LLP

(57) ABSTRACT

A key structure applicable in an electronic device for pressing an electrical button of the electronic device is disclosed. The key structure includes an annulus section for fixing the key structure in the electronic device, and a pair of key sections, each of which extends from the annulus section and has a protruding section and a retention section, wherein the protruding section protrudes out of an inner wall of the key section to prevent the key section from sinking, and the retention section extends from at least one side of the key section to prevent the key section from protruding upwards. With each key section being additionally provided with the protruding section and the retention section, the key structure efficiently prevents the key sections from protruding upwards and sinking.

11 Claims, 2 Drawing Sheets

KEY STRUCTURE APPLICABLE IN AN ELECTRONIC DEVICE

BACKGROUND OF THE INVENTION

1. Field of the Invention

The present invention relates generally to a key structure, and more particularly, to a key structure applicable in an electronic device such as a notebook computer.

2. Description of Related Art

Due to the requirement for portability, a conventional notebook computer is often equipped with a device for controlling a screen cursor. Early on, a conventional notebook computer is equipped with a track ball that functions as the device for controlling the screen cursor. Touch pads and trackpoints are commonly found in the present market. Trackpoints are mainly applied in notebook computers manufactured by the International Business Machines (IBM) Co. In practice, to facilitate manipulation of a touch pad or a trackpoint, keys, which are equivalent to the left and right keys of a mouse, are usually installed in front of the keyboard, and electrical buttons intended to generate electrical signals are installed under the keys.

U.S. Pat. No. 6,177,924 B1 disclosed a key fixing structure for fixing a key installed inside the base of a notebook computer to the bottom surface of the upper housing of the notebook computer. A pair of through holes is installed on the upper housing of the notebook computer, and a key set including two keys protrudes out of the surface of the upper housing via the respective through holes. The keys are provided with elastic arms and thereby return to the original height when pressed and released.

FIG. 1 shows another known key structure for touch pads used in notebook computers. A key structure 1' having a big plastic frame is embedded in an upper housing 2 of a notebook computer. A touch pad 2' is embraced in the key structure 1'. The key structure 1' comprises a pair of keys 11' and annulus sections 12' for connecting the keys 11'. The annulus sections 12' engage with the upper housing 2 of the notebook computer, so as to enable the keys 11' to form cantilever structures and return to the original height when pressed and released.

However, the above known designs share a common drawback, that is, a key will overtravel if pressed too hard. If this happens all the time, the elastic arm or the annulus section is likely to loss its elasticity, and in consequence the key does not return to the original height but becomes sunken. In addition, appearing in the form of a cantilever structure and being roughly aligned with the surface of the upper housing of the notebook computer, the key moves aside and protrudes upward if the user has a bad habit of pulling a button.

Furthermore, a certain gap exists between the upper housing of the notebook computer and a key of the key fixing structure disclosed in both U.S. Pat. No. 6,177,924 B1 and FIG. 1, and therefore dust or liquid, such as water, may enter the notebook computer through the gap, thus damaging inner components of the notebook computer.

Accordingly, an issue that currently needs urgent solution involves developing a key fixing structure intended for the touch pad of a notebook computer, to overcome various drawbacks of the aforesaid conventional technology, preventing the keys from becoming sunken or protruding upwards, and avoiding intrusion of foreign bodies and the resultant damage which may otherwise be done to inner components.

SUMMARY OF THE INVENTION

Accordingly, it is a primary objective of the present invention to solve the drawbacks of the aforementioned conventional technology by providing a key structure capable of preventing a key from becoming sunken or protruding upwards.

It is another objective of the present invention to provide a key structure for avoiding intrusion of foreign bodies and the resultant damage which may otherwise be done to inner components.

In order to attain the object mentioned above and the others, the present invention provides a key structure installed in a housing of an electronic device and intended to press an electrical button of the electronic device, including an annulus section for fixing the key structure in a housing of the electronic device, a pair of key sections respectively extended from the annulus section, two protruding sections being installed in the key sections respectively, each of the protruding sections being installed under its corresponding key section and protruding out of the inner wall of the key section to prevent the key section from sinking, and two retention sections being installed in the key sections respectively, each of the retention sections being installed under its corresponding key section and extending from at least one side of the key section to prevent the key section from protruding upwards.

Each protruding section is installed in the proximity of an outer corner of the key section and is either a post or a bump. Each retention section extends outward from at least one side of the key section to form a lateral margin.

The aforesaid annulus section of the key structure is U-shaped. The aforesaid pair of keys extend from the free ends of the retention arms respectively and turn the key structure into an almost closed frame. Furthermore, a partition groove is installed between the two keys to separate them.

To achieve the above and other objectives, the present invention further provides a key structure installed in an electronic device to press an electrical button. The key structure includes at least one key having a fixing end for fixing the key to the electronic device and a free end for pressing the electrical button, wherein the key further has its free end provided with a protruding section and a retention section, the protruding section protrudes out of the inner wall of the free end to prevent the key from sinking, whereas the retention section extends from at least one side of the free end to prevent the key from protruding upwards.

In short, with a key being equipped with a protruding section and a retention section, the key structure efficiently prevents the key from protruding upwards and sinking, and avoids intrusion of foreign bodies and the resultant damage which may otherwise be done to inner components. Therefore, application of the present invention can solve various drawbacks of the conventional technology so that the present invention will bring greater value to the industry.

DETAILED DESCRIPTION OF PREFERRED EMBODIMENTS

Embodiment of the present invention is illustrated with the following specific, concrete examples. With what is disclosed in this specification, other advantages and functions of the present invention are apparent to those skilled in the art. The present invention can also be performed or applied by other different embodiments. Various modifications and changes may be made to the details of this specification, based on different views and applications, without departing from the spirit of the present invention.

First Embodiment

Figure 1:
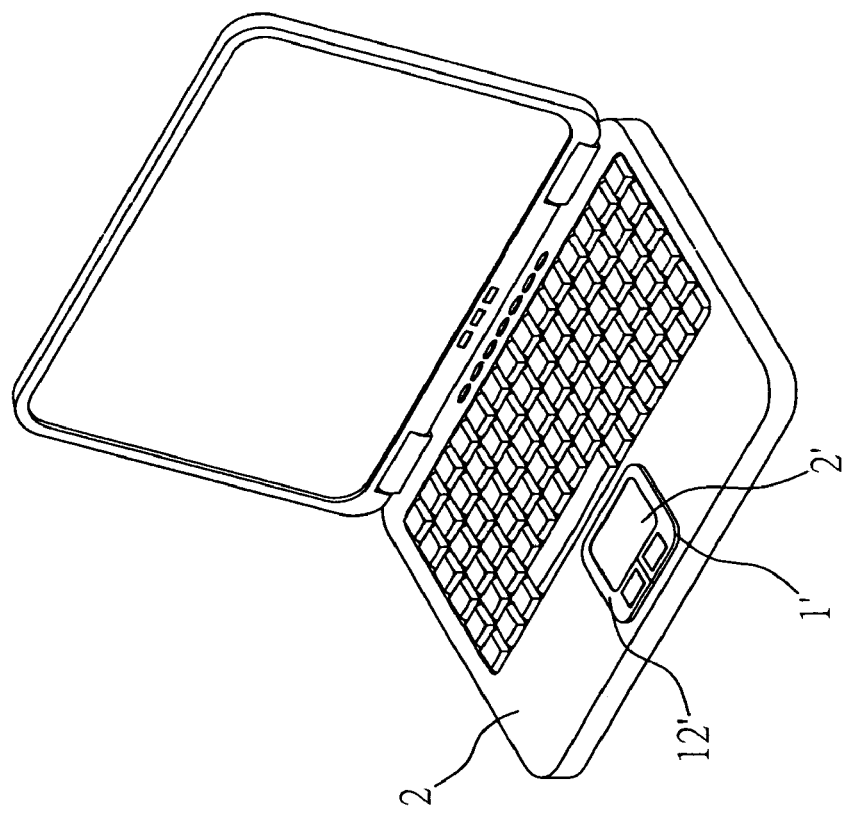
FIG. 1 is a schematic diagram showing an enlarged view of a key structure of a conventional notebook computer.
Figure 1:
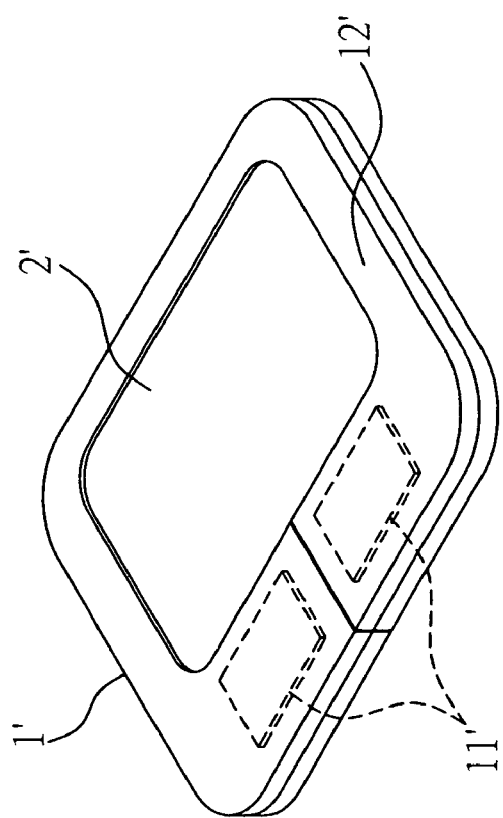
Figure 2:
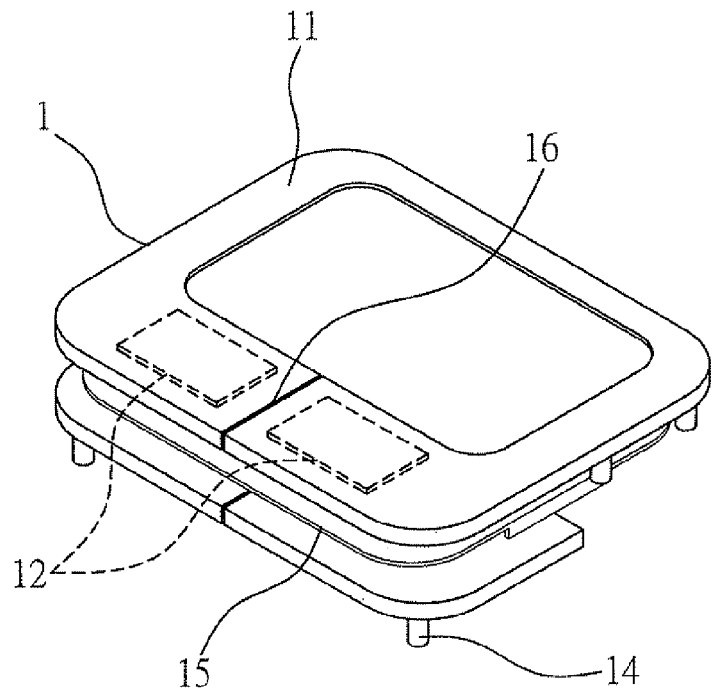
FIG. 2 is a three-dimensional view of the first embodiment of a key structure according to the present invention.

Referring to FIG. 2, a three-dimensional view of a key structure applied in a notebook computer according to the present invention. The key structure 1 is a rectangular frame, and is used to embrace a touch pad 2' (as shown in FIG. 1) of the notebook computer. The touch pad 2' is used to control the screen cursor of the notebook computer. The key structure 1 comprises a U-shaped annulus section 11 and a pair of key sections 12 respectively extending from the annulus section 11, the key sections 12 being separated by a partition groove 16 and having functions similar to those of a selecting key (the left key) and a confirming key (the right key) of a general mouse.

The annulus section 11 is coupled with an upper housing 2 of the notebook computer (referring to FIG. 1), and is used to embrace the touch pad 2' and keep the key sections 12 in a cantilever state, so that the key sections 12 return to the original height when pressed and released.

Referring to FIG. 2 for a schematic diagram of the structure of the keys, each of the key sections 12 comprises an inner wall and a projection (not illustrated) protruding out of the inner wall to a press an electrical button installed in the notebook computer. Each of the key sections 12 further comprises a protruding section 14 and a retention section 15. The protruding section 12 is either a post or a bump and extends downwards from an outer corner of each of the key sections 12. The retention sections 15 extend outward from the lower ends of the two opposing sides of the key sections 12 respectively, to form lateral margins.

Installed in a notebook computer, the key structure 1 is coupled with the upper housing 2 (as shown in FIG. 1) of the notebook computer. The projection of each key section 12 matches an electrical button in the notebook computer (not illustrated). The notebook computer is equipped with necessary components of which an operating system is composed, such as a processor, motherboard, hard disk and memory, etc., but the aforesaid components do not constitute any technical feature of the present invention, nor are they new to the conventional technology. Hence, disclosure of the inner structure of the notebook computer and the corresponding description are herein left out for the sake of the conciseness of this specification and the accompanying drawings.

Referring to FIG. 2 further, normally, users are used to pressing the edges and the corners of the key sections 12, causing an affected key section 12 to sink. In the present invention, the protruding section 14, which appears in the form of a post or a bump, extends from an edge or a corner of the inner wall of each key section 12, and the protruding section 14 should never be high enough to affect the travel requirement of the key section 12, thus efficiently solving the sinking problem confronting the key sections 12.

In the first embodiment, the protruding section 14, which appears in the form of a post or a bump, extends from an edge or a corner of each key section 12. Understandably, the protruding section 14 can, however, be replaced by a plurality of protruding sections 14 evenly distributed over the lower edge of the key; to be precise, the position, number and structure of the protruding sections 14 are not limited to the above-mentioned.

In addition, each key section 12 is enclosed (along its lateral margin) by a retention section 15. Upon its installation in the notebook computer, the retention section 15 is coupled with the upper housing 2 of the notebook computer and thereby prevents the key section 12 from protruding upwards. And each key section 12 can employ the retention section 15 to cover the gap between the key section 12 and the upper housing 2 of the notebook computer, thereby avoiding intrusion of foreign bodies and the resultant damage which may otherwise be done to inner components.

In short, the key structure of the present invention comprises an annulus section for fixing the key structure in a housing of the electronic device, a pair of key sections respectively extended from the annulus section, two protruding sections corresponding to the key sections, each of the protruding sections being installed under its corresponding key section and protrudes out of the inner wall of the key section to prevent the key section from sinking, and two retention sections corresponding to the key sections, each of the retention sections being installed under its corresponding key section and extending from at least one side of the key section to prevent the key section from protruding upwards.

Second Embodiment

Figure 3:
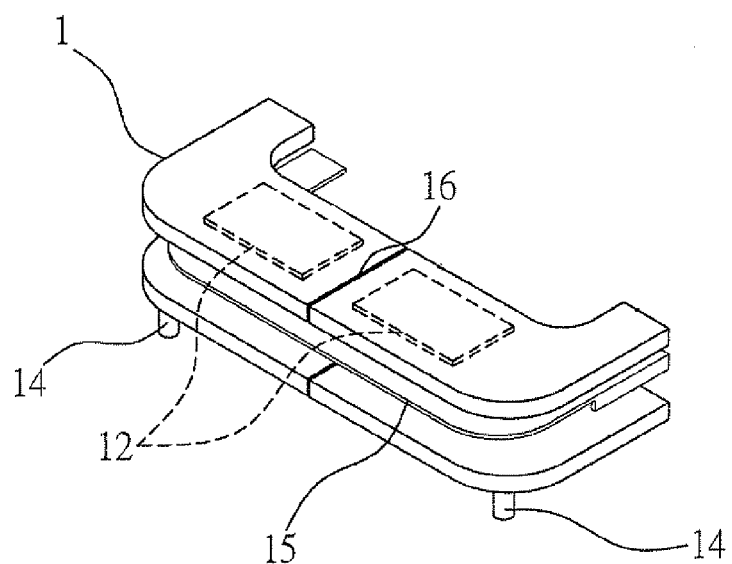
FIG. 3 is a three-dimensional view of the second embodiment of a key structure according to the present invention.

Referring to FIG. 3, a schematic diagram of the second embodiment of a key structure according to the present invention.

In the second embodiment, a pair of key sections 12 are installed in the key structure 1. Each of the key sections 12 comprises a fixing end for fixing itself, a free end for pressing, a protruding section which is installed on the free end and protrudes out of the inner wall of the free end to prevent the key section 12 from sinking, and a retention section installed on the free end and extended from at least one side of the free end to prevent the key section 12 from protruding upwards.

In the aforementioned second embodiment, the key structure 1 comprises a pair of key sections 12. Understandably, a single key section 12 having a fixing end for fixing itself and a free end for pressing itself, wherein the free end is further provided with a protruding section and a retention section, indicating no deviation from the spirit and the technical scope of the present invention.

The above descriptions of the detailed embodiments are solely intended to disclose the features and functions of the present invention, but not intended to limit the scope of the present invention. Equivalent variations and modifications based on whatever are disclosed in the present invention but constituting no departure from the aforesaid spirit and principles of the present invention should fall within the scope of the appended claims.

What is claimed is:

1. A key structure applicable in an electronic device to press an electrical button thereof, the key structure comprising:

at least one key comprising:
a fixing end for fixing the key to the electronic device;
a free end for pressing the electrical button;

a protruding section installed on the free end and protruding out of an inner wall of the free end to prevent the key from sinking, the protruding section being one of a post and a bump; and a retention section installed on the free end and extended from at least one side of the free end to prevent the key from protruding upwards.

2. The key structure of claim 1, wherein the retention section is outwardly extended from the free end of the key to form a lateral margin.

3. The key structure of claim 1, wherein the protruding section is installed under the key and protrudes out of an inner wall of the key to prevent the key from sinking.

4. A key structure applicable in an electronic device to press an electrical button thereof, the key structure comprising:

an annulus section for fixing the key structure in a housing of the electronic device;

a pair of key sections respectively extended from the annulus section;

two protruding sections corresponding to the key sections, each of the protruding sections being installed under its conesponding key section and protruding out of an inner wall of the corresponding key section to prevent the corresponding key section from sinking; and two retention sections corresponding to the key sections, each of the retention sections being installed under its corresponding key section and extended from at least one side of the corresponding key section to prevent the corresponding key section from protruding upwards.

5. The key structure of claim 4, which is a rectangular frame.

6. The key structure of claim 4, which is made of plastic.

7. The key structure of claim 4, wherein the retention sections are U-shaped.

8. The key structure of claim 4, wherein the protruding sections are one of posts and bumps.

9. The key structure of claim 4, wherein the protruding sections are located in proximity to outer corners of the key sections.

10. The key structure of claim 4, wherein the retention sections are extended outwards from the key sections to form lateral margins.

11. The key structure of claim 4 further comprising a partition groove installed between the key sections.

* * * * *